No. 889,726. PATENTED JUNE 2, 1908.
H. B. SHERMAN.
HOSE CLAMP.
APPLICATION FILED OCT. 19, 1907.
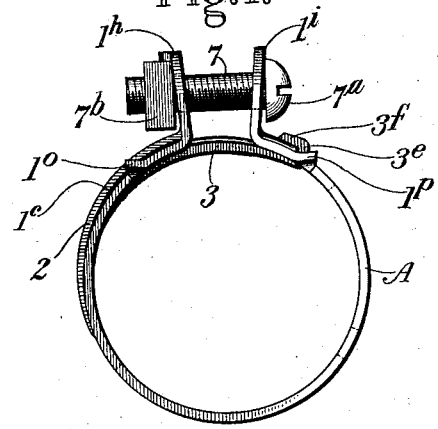
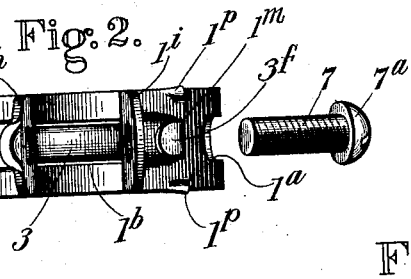
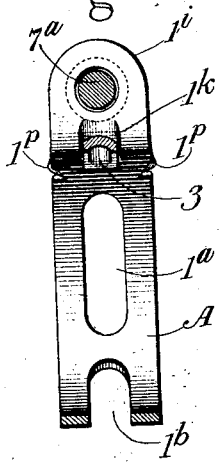
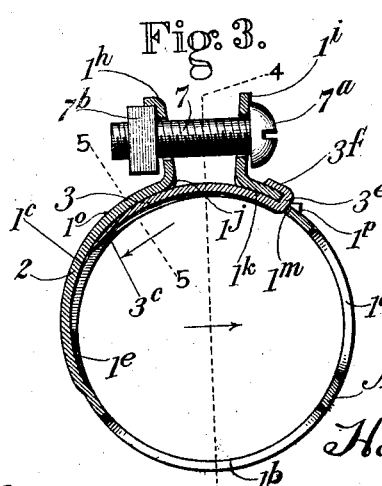
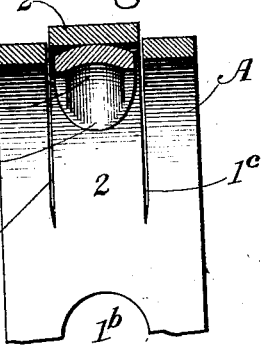
Inventor
Howard B. Sherman
Witnesses
By
Attorneys

UNITED STATES PATENT OFFICE.

HOWARD B. SHERMAN, OF BATTLE CREEK, MICHIGAN.

HOSE-CLAMP.

No. 889,726.   Specification of Letters Patent.   Patented June 2, 1908.

Application filed October 19, 1907. Serial No. 398,200.

*To all whom it may concern:*

Be it known that I, HOWARD B. SHERMAN, of Battle Creek, in the county of Calhoun and State of Michigan, have invented certain new and useful Improvements in Hose-Clamps; and I hereby declare that the following is a full, clear, and exact description thereof, reference being had to the accompanying drawings, which form part of this specification.

This invention is an improvement in hose clamps and its object is to produce a very strong and efficient hose clamp which can be stamped out of sheet or strap metal and is especially designed to be formed out of heavy or tough metal such as bar or sheet steel which is too thick and tough to be easily displaced or swaged in dies.

One object of the invention is to provide such clamps with an attached tongue to bridge the space between the ears of the clamps and prevent puckering or bulging of the hose between the ears; and this part of the invention has particular reference to the formation of such tongue and the mode of attaching the same to the clamp band.

The invention is also designed to provide the clamp band with a recess for the accommodation of the free end of the said tongue and to provide this recess with a guard whereby the end of the tongue is prevented from projecting out of the clamp; and said guard prevents the end of the tongue catching upon exterior objects, and imparts a more symmetrical appearance to the clamp.

The invention will be clearly understood by reference to the clamp shown in the accompanying drawings and the following description thereof.

In said drawings—Figure 1 is a side view of the complete clamp. Fig. 2 is a top view thereof, the bolt and nut being removed. Fig. 3 is a central section therethrough. Fig. 4 is a transverse section on line 4—4, Fig. 3. Fig. 5 is an enlarged transverse section on line 5—5, Fig. 3.

The body A of the clamp can be made from bar steel or any other suitable metal;—steel being at present preferred, because it can be obtained in strap form of the desired width. A suitable length is cut from such strap to form the clamp body and it is then subjected to the action of proper dies by which one or more slots ($1^a$, $1^b$, as shown) are cut in the metal for the purpose of lightening it and insuring its hold upon the hose. The dies (not shown) are also so formed that at one side of the body the body is punched so as to form a channel $1^e$ on its inner side, but the metal displaced to form this channel is not punched entirely away from the body but only cut loose therefrom at the sides of the channel as shown at $1^c$. The ends of the partially punched away portion 2 remain integrally connected with the body of the clamp, but the main portion of part 2 is forced out sufficiently from the body to form a channel $1^e$ on the interior of the body as shown; but said channel is covered and guarded externally by the partly severed portion or guard 2. The channel $1^e$ is provided for the accommodation of the free end of the tongue 3 hereinafter referred to. The portion 2 thus forms a guard which protects the free end of the tongue and prevents it projecting through the channel $1^e$ to the outside of the clamp and catching on exterior objects.

The ends of the body are turned up at $1^h$ and $1^i$ and form ears which are perforated for the passage of the fastening bolt 7 which has a head $7^a$ on one end and a nut $7^b$ on the other as shown.

At the base of the ear $1^h$ which is adjacent the guard 2 is shown a slight recess $1^j$ which is practically formed in the manufacture of the clamp by the partial punching of the guard 2 from the body of the clamp. At the base of ear $1^i$ is shown a recess $1^k$ which may be provided for the accommodation of the fixed end of the tongue 3, and at the inner end of this recess is a hole $1^m$ through the body of the strap in which hole the extremity of the tongue 3 is secured. This tongue 3 is preferably stamped from metal, and is curved longitudinally as shown in Figs. 1 and 3 on an arc whose radius is equal to that of the hose for which the clamp is designed. Said tongue is also concavo-convex in cross section, being concave on its under side and convex on its upper side in cross section as shown in Figs. 4 and 5.

The tongue 3 is subjected to considerable strain as the clamp is tightened upon the hose and by making it concavo-convex in cross section it is greatly strengthened and is less liable to distortion under pressure and will therefore make a more secure and tight closure between the ears.

The tongue is provided at one end with a projecting portion $3^e$ which is inserted through the opening $1^m$ in the clamp body and it is then bent over the edge of the opening and down upon the body as shown at 3ᶠ and is forcibly compressed thereupon, and is thus securely and rigidly connected, as by a rivet point, to the body. The free end of the tongue is sufficiently long to cross the space between the ears and when the clamp is applied to a hose the free end of the tongue engages in the channel 1ᵉ and is protected by the guard 2.

The free end of the tongue 3 is preferably pointed or thinned as shown at 3ᶜ, by being hammered or ground off, to enable it to enter and move more readily in the channel while the clamp is being tightened upon the hose, in case the hose should bulge up into the channel, as it is apt to do. In such event the point of the tongue acts as a wedge and enters between the guard and hose and enables the tongue to pass readily over the surface of the hose without tearing it.

The clamps as shown and described can be made out of very stiff metal, such as bar or strap steel, which is not ductile enough to be readily stamped into shape,—and the invention is particularly useful in the production of stiff strong clamps. The tongues might be formed from the planchets punched from slots 1ᵃ, 1ᵇ in the bodies The projecting end 3ᵉ of the tongue affords a point of engagement for a jaw of the vises commonly used in applying these clamps to high pressure hose; the body of the clamp is shown as provided with jaw engaging projections 1ᵒ and 1ᵖ adjacent the respective ears, such projections being formed by stamping up portions of the metal of the body as shown in the drawings.

Having described my invention what I claim as new and desire to secure by Letters Patent is:

1. The herein described hose clamp comprising a stamped metal body provided with ears, a channel adjacent one of the ears and a guard covering said channel, said guard being integral with the body at each end of the channel but separated therefrom on the sides, and a tongue extending from the opposite end of the body and adapted to bridge the space between the ears and engage in said channel under said guard.

2. A hose clamp comprising a body stamped from metal and having out-turned perforated ears on its ends, a channel adjacent one of the ears, a guard covering said channel and integrally connected with the body at its ends but separated therefrom on the sides, and a hole in the body adjacent the opposite ear; with a tongue formed of a separate piece of metal having one end passed through said hole and bent over and clamped upon the outside of the body, the free end of said tongue extending across the space between the ears and engaging the said channel.

3. The herein described hose clamp comprising a metallic body stamped from suitable metal and provided with out-turned perforated ears on its ends, a hole in the body adjacent one ear, a channel in the body adjacent the opposite ear, a guard for said channel integral with but partially severed from the body, a tongue concavo-convex in cross section having one end secured in said hole and its free end extended across the space between the ears and entering the guarded channel.

4. The herein described hose clamp comprising a metallic body stamped from suitable metal and provided with out-turned perforated ears on its ends, vise engaging projections adjacent the ears stamped up from the body of the clamp, a hole in the body adjacent one ear, a channel in the body adjacent the opposite ear, a guard for said channel integral with but partially severed from the body, a tongue concavo-convex in cross section having one end secured in said hole and its free end extended across the space between the ears and entering the guarded channel.

In testimony that I claim the foregoing as my own, I affix my signature in presence of two witnesses.

HOWARD B. SHERMAN.

Witnesses:
FRANK M. ANDRESS,
M. KATHARINE ROSEBROOK.